(12) United States Patent
Mu et al.

(10) Patent No.: US 9,715,433 B2
(45) Date of Patent: Jul. 25, 2017

(54) RECONCILIATION IN SYNC REPLICATION

(71) Applicant: NetApp, Inc., Sunnyvale, CA (US)

(72) Inventors: Yuedong Mu, San Jose, CA (US);
Manoj V. Sundararajan, Sunnyvale, CA (US); Ching-Yuk Paul Ngan, Redwood City, CA (US)

(73) Assignee: NetApp, Inc., Sunnyvale, CA (US)

( * ) Notice: Subject to any disclaimer, the term of this patent is extended or adjusted under 35 U.S.C. 154(b) by 172 days.

(21) Appl. No.: 14/472,885

(22) Filed: Aug. 29, 2014

(65) Prior Publication Data
US 2016/0062836 A1  Mar. 3, 2016

(51) Int. Cl.
G06F 11/16 (2006.01)
G06F 11/14 (2006.01)
G06F 11/20 (2006.01)

(52) U.S. Cl.
CPC ...... G06F 11/1451 (2013.01); G06F 11/1658 (2013.01); G06F 11/2058 (2013.01); G06F 11/2069 (2013.01); G06F 2201/84 (2013.01)

(58) Field of Classification Search
USPC .................................................. 714/6.3, 6.32
See application file for complete search history.

(56) References Cited

U.S. PATENT DOCUMENTS

| | | | |
|---|---|---|---|
| 6,070,244 A * | 5/2000 | Orchier | G06F 21/6218 709/223 |
| 6,434,639 B1 * | 8/2002 | Haghighi | G06F 12/0831 710/35 |
| 6,536,037 B1 * | 3/2003 | Barrese | G06F 8/71 703/2 |
| 6,606,744 B1 * | 8/2003 | Mikurak | H04L 29/06 717/174 |
| 6,671,818 B1 * | 12/2003 | Mikurak | G06Q 10/06 714/4.21 |
| 7,149,858 B1 * | 12/2006 | Kiselev | G06F 11/2076 711/162 |
| 7,191,299 B1 * | 3/2007 | Kekre | G06F 11/2074 707/999.202 |
| 7,370,025 B1 * | 5/2008 | Pandit | G06F 17/30212 707/610 |
| 7,406,487 B1 * | 7/2008 | Gupta | G06F 17/30575 |
| 8,689,043 B1 * | 4/2014 | Bezbaruah | G06F 11/2058 711/162 |
| 8,938,727 B2 * | 1/2015 | Asipov | G06F 21/125 717/140 |
| 2002/0124070 A1 * | 9/2002 | Pulsipher | H04L 41/0663 709/223 |
| 2003/0115080 A1 * | 6/2003 | Kasravi | G06F 17/27 715/254 |
| 2004/0181707 A1 * | 9/2004 | Fujibayashi | G06F 11/2069 714/6.12 |

(Continued)

Primary Examiner — Kamini Patel
(74) Attorney, Agent, or Firm — Cooper Legal Group, LLC

(57) ABSTRACT

A distributed storage system replicates data for a primary logical storage object on a primary node of the storage system to a secondary logical storage object on a secondary node on the distributed storage system. Failures in writing data to the primary logical storage object or failures in the replication of the data to the secondary logical storage object can cause data that should be synchronized to become divergent. In cases where the data may be divergent, reconciliation operations can be performed to resynchronize the data.

20 Claims, 7 Drawing Sheets

(56) References Cited

U.S. PATENT DOCUMENTS

| | | | | |
|---|---|---|---|---|
| 2005/0240840 | A1* | 10/2005 | Taylor | H04B 1/74 714/724 |
| 2007/0299955 | A1* | 12/2007 | Hoffman | G06F 17/30581 709/223 |
| 2008/0288646 | A1* | 11/2008 | Hasha | H04L 67/1095 709/228 |
| 2008/0288811 | A1* | 11/2008 | Sudhakar | 714/4.11 |
| 2009/0119662 | A1* | 5/2009 | Fangmeier | G06F 8/60 717/176 |
| 2009/0198954 | A1* | 8/2009 | Sanders | G06F 17/30241 711/212 |
| 2009/0319649 | A1* | 12/2009 | Larsen | H04L 41/0846 709/222 |
| 2010/0332132 | A1* | 12/2010 | Okude | G01C 21/3476 701/414 |
| 2011/0307736 | A1* | 12/2011 | George | G06F 17/30519 714/6.2 |
| 2013/0013727 | A1* | 1/2013 | Walker | H04W 4/003 709/217 |
| 2013/0030692 | A1* | 1/2013 | Hagan | G01C 21/32 701/410 |
| 2013/0042082 | A1* | 2/2013 | Tamura | G06F 12/00 711/154 |
| 2013/0232152 | A1* | 9/2013 | Dhuse | G06F 17/30321 707/741 |
| 2014/0032525 | A1* | 1/2014 | Merriman | G06F 17/30283 707/713 |
| 2014/0081475 | A1* | 3/2014 | Dorofeev | G05B 15/02 700/292 |
| 2014/0279884 | A1* | 9/2014 | Dantkale | G06F 17/30575 707/620 |
| 2014/0330616 | A1* | 11/2014 | Lyras | G06Q 10/0635 705/7.28 |
| 2014/0372458 | A1* | 12/2014 | Jurca | G06F 17/30867 707/754 |
| 2015/0227404 | A1* | 8/2015 | Rajagopal | G06F 11/0748 714/37 |
| 2015/0254298 | A1* | 9/2015 | Bourbonnais | G06F 17/30371 707/610 |
| 2016/0062685 | A1* | 3/2016 | Sundararajan | G06F 3/0619 711/162 |

* cited by examiner

RECONCILIATION IN SYNC REPLICATION

BACKGROUND

Aspects of the disclosure generally relate to the field of networked storage systems, and, more particularly, to reconciling data that is to be replicated across a networked storage system.

A networked storage system is a processing system that is used to store and retrieve data on behalf of one or more hosts on a network. One or more storage controllers in the networked storage system operate on behalf of one or more hosts to store and manage data in a set of mass storage devices, such as magnetic or optical storage-based disks or tapes. Some storage controllers are designed to service file-level requests from hosts, as is commonly the case with file servers used in network attached storage (NAS) environments. Other storage controllers are designed to service extent-level requests from hosts, as with storage controllers used in a storage area network (SAN) environment. Still other storage controllers are capable of servicing both file-level requests and extent-level requests, as is the case with certain storage controllers made by NetApp, Inc. of Santa Clara, Calif.

A networked storage system can be configured to provide high availability and disaster recovery capabilities. In such configurations, two or more storage controllers, typically located at different sites, are used to replicate data. Data received from a host by a first controller can be written to storage devices local to the first storage controller. In addition, the first storage controller can replicate the data on a second storage controller by forwarding the data to a second storage controller. The second storage controller then stores a copy of the data on storage devices local to the second controller. In the event of a failure or other problem with storage attached to the first controller, the replicated data can be retrieved from storage local to the second controller.

BRIEF DESCRIPTION OF THE DRAWINGS

The aspects of the disclosure may be better understood by referencing the accompanying drawings.

DETAILED DESCRIPTION OF EXAMPLE ILLUSTRATIONS

Figure 1:
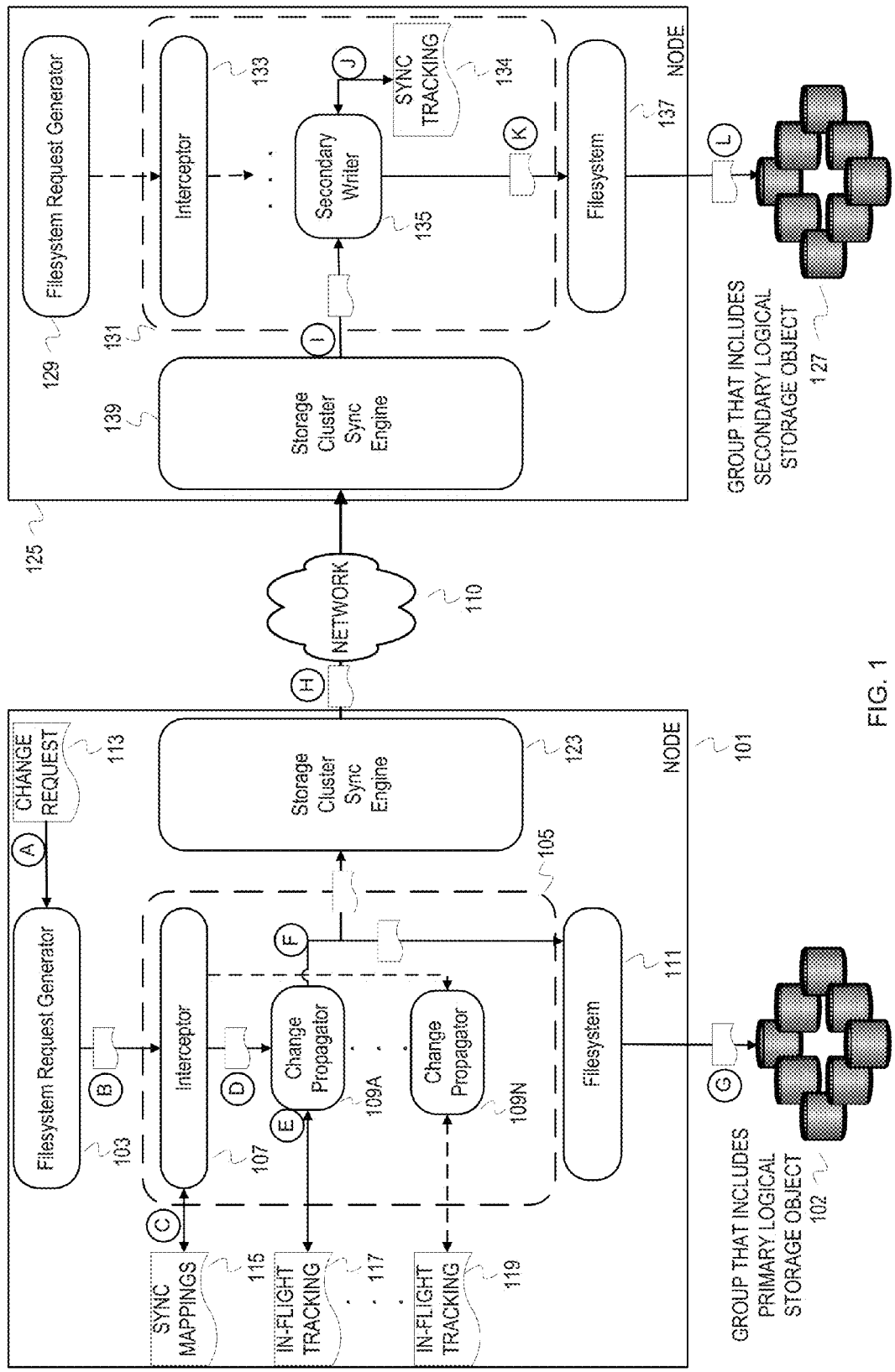
FIGS. 1 and 2 depict example storage cluster synchronization engines coordinating a data change between primary and secondary logical storage objects in different clusters responsive to a change request.

The description that follows includes example systems, methods, techniques, instruction sequences and computer program products that embody techniques of the disclosure. However, it is understood that the described aspects of the disclosure may be practiced without these specific details. For instance, although examples refer to replicating data using a primary node and a secondary node, aspects of the disclosure may be readily applied to architectures having a hierarchy of nodes that includes more than two levels, or architectures with multiple secondary nodes. Further, although examples refer to disks and disk arrays, aspects of the disclosure are not so limited. Aspects of the disclosure may be implemented on storage systems that use solid state storage devices, optical storage devices, federations of individual storage devices, combinations of different types of storage devices, etc. Additionally, the examples are provided in terms of write operations that are to be replicated across multiple nodes in a networked storage system. However, the aspects of the disclosure may be applied to other types of operations that result in data replication across multiple nodes. In other instances, well-known instruction instances, protocols, structures and techniques have not been shown in detail in order not to obfuscate the description.

Terminology

This description uses the term "storage element" to refer to any entity within a storage system that hosts and/or manages access to data. Storage elements referred to herein can be categorized as managing storage elements and hosting storage elements. The distinction between a managing storage element and a hosting storage element arises from the primary functionality of the storage element. Managing storage elements primarily manage access to hosting storage elements. Managing storage elements process requests from other devices (e.g., clients) and can originate requests to perform operations (e.g., snapshot operations). Regardless of whether the request is from another device or originates from the managing storage element, the managing storage element transmits a request to a hosting storage element. Examples of a managing storage element include a file server and a storage controller. A hosting storage element primarily performs operations that ultimately fulfill requests from the perspective of the managing storage element. A hosting storage element performs a read of or a write to a location specified by a request from a managing storage element. This read or write may be performed on a disk or multiple disks. In the case of multiple layers of virtualization, the read or write may be performed on what appears to be a disk or disks from the perspective of the managing storage element. Examples of a hosting storage element include a disk drive, an optical drive, a storage array, and a tape drive.

The terms managing storage element and hosting storage element are used based on the primary functionality of a storage element because functionality is not exclusive between the elements. For instance, a storage controller may have data locally stored in cache to expedite handling of access requests. Even though the storage controller can fulfill access requests, the primary functionality of the storage controller is not to read data from and write data to local memory. Similarly, a hosting storage element can include hardware that manages access to disks. For instance, a redundant array of independent disks (RAID) controller and an array of disks can be housed within a single enclosure. Although the RAID controller manages access to the array of disks. the primary functionality of the components housed within that single enclosure is to fulfill requests received from a managing storage element.

The description also uses the terms full synchronization ("full sync") and semi-synchronization ("semi sync"). These terms refer to different types of synchronization configurations. A "full synchronization" configuration, as used herein, refers to a configuration that delays sending a reply confirming a change request has been performed until the change has been synchronized across a primary logical storage object and a secondary logical storage object(s). A "semi-synchronization" configuration, as used herein, refers to a configuration that allows a reply confirming a change request has been performed to be sent after the change has been performed on a primary logical storage object while synchronization with the secondary logical storage object(s) may still be in progress.

The description uses the term "request" to refer to a communication between software entities or hardware entities that requests something be done, and to avoid the variation in names, data fields, etc., used in various protocols. A request can indicate a request for data to be read, data to be written, or some other data processing request. A request can indicate the type of operation (e.g., read, write), a target of the request (e.g., a logical storage object identifier), and an identifier of a requestor. Additional information may be indicated in a request depending upon the governing protocol. But this description does not delve into the details of the additional information. Further, a number of protocols can form what is referred to as a protocol stack. A protocol stack can be considered the series of processing modules that a request passes through or traverses. At each layer of the protocol stack, headers and/or trailers may be added or removed from the request. For this description, at least some stack processing is not described to avoid adding further complexity to the description. This description will refer to a request as a request regardless of associated headers or trailers.

Introduction

Clustering generally refers to grouping hardware elements together to reap the benefit of the group ("cluster") of hardware elements (e.g., disk drives, storage arrays, file servers, storage controllers, etc.) that cannot be gained from individual hardware elements. Clustering can be used for various storage features, examples of which include load balancing, failover support, increasing I/O bandwidth, and data availability. To support these aspects of storage and provide a consistent view of storage, data is synchronized between the supporting storage elements. The different hardware storage elements are often referred to as primary storage elements and secondary storage elements based on which storage elements are initially and/or preferentially used (e.g., by configuration) to supply data to requestors and to modify data for requestors. In addition, a cluster of storage elements can be designated as a primary cluster and a cluster of storage elements can be designated as a secondary cluster.

Many storage system functionalities are deployed as features of storage virtualization. Often, storage virtualization software/tools obfuscate the actual hardware elements that constitute a storage system. Thus, requestors (sometimes referred to herein as clients) often read from and write to logical storage objects or logical storage containers, examples of which include logical unit numbers (LUNs), files, virtual machine disks (VMDKs), virtual volumes, and logical partitions. Any number of layers of virtualization can separate actual storage system hardware elements and a client sending an access request. Each storage system hardware element may host numerous logical storage objects and/or numerous parts of logical storage objects. Moreover, a storage controller handling a request on behalf of a client may communicate with a virtual storage array that appears to be a physical storage array. Thus, a logical storage object, which is presented as if a storage array, may be presented as hosting multiple logical storage objects.

Overview

Aspects of the disclosed subject matter include reconciling data after synchronization requests have been issued to write data that is to be replicated across multiple storage devices, storage controllers or storage subsystems. A networked storage system can be configured to replicate data across multiple storage devices, storage controllers, or storage subsystems. Replicating data can be useful in disaster recovery operations. However, replicating data can result in processing overhead on a networked storage system. In order to minimize the response time to a client issuing a write request, the networked storage system can be configured to cause the data to be replicated in parallel on both a primary node and a secondary node. However, in some instances, an error in either or both of the primary node and secondary node can cause the data to become divergent. In other words, data that should be the same on a primary node and a secondary node is actually different. For example, if a write request succeeds on the secondary node, but fails on the primary node, the primary node will retain old data at the target location while the secondary node will contain the new data at the target location. According to some aspects, a primary node uses responses to a write request to determine that the data to be replicated may be divergent, and performs operations to reconcile the differences in the data. Performing such reconciliation during processing of a write request can reduce the amount of recovery time required, thereby allowing a system to meet designated recovery point objectives (RPOs) and recovery time objectives (RTOs). A business specifies an RTO as the maximum amount of time that the business tolerates lack of access to the business' data. A business specifies an RPO as the amount of data in terms of time that can be lost due to an interruption. For instance, a business can specify an RTO as 15 seconds. In other words, the business will accept at most 15 seconds from the time of a service interruption or failure to the time of full recovery of their systems. For an RPO, a business can specify 5 seconds. That means that the business will not accept losing any more than the data written (e.g., new writes, updates, etc.) in the 5 seconds that precede a failure or interruption.

Data consistency and availability can be provided at the granularity of logical storage objects in storage solutions that use storage virtualization in clustered storage environments. For availability, data is maintained on different storage elements at different sites as previously mentioned. To ensure consistency of data across the different storage elements, synchronization is performed across the different storage elements. At the granularity of logical storage objects, data can be synchronized efficiently across the different storage elements at distant sites because, at least partly, the amount of data being synchronized is smaller and less susceptible to negative incidents in a network that carries the data. Changes to data are synchronized across storage elements in different clusters by propagating the changes from a node associated with a primary logical storage object (i.e., the logical storage object specified in a change request) to a secondary logical storage object (i.e., a logical storage objected associated with the primary logical storage object for synchronization). To satisfy the strictest RPOs (e.g., RPO=0) and RTOs while maintaining performance, filesystem requests are intercepted prior to being sent to a filesystem that hosts the primary logical storage object ("primary filesystem") and propagated to a filesystem of a node associated with the secondary logical storage object ("secondary filesystem"). The logical storage objects have immutable identifiers that are exclusive at least within any associated clusters to allow efficient identification of the logical storage objects across clusters. Intercepting a filesystem request after it has been generated from a storage protocol specific request and prior to the filesystem request being sent to the primary filesystem avoids encumbering the propagating operations with storage protocol specific and/or application specific operations, which further reduces the size of the change request being propagated as well as number of processing operations. Having the entities that handle the operations to support synchronization directly interface with the filesystem leverages mechanisms of the filesystem for efficient conveyance of filesystem responses.

Example Illustrations

Figure 2:
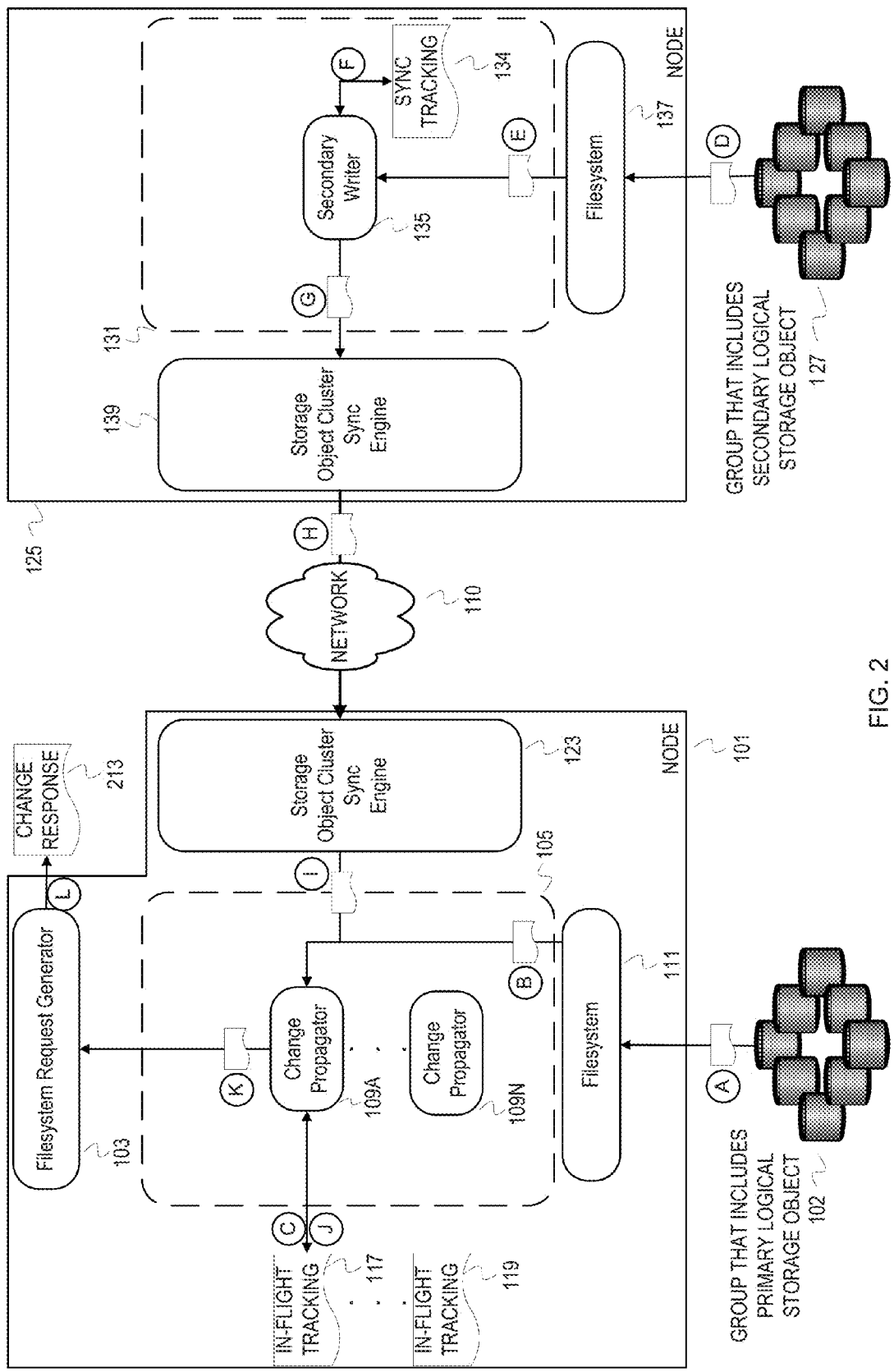

The example illustrations depicted in FIGS. 1-2 depict different degrees of example details as an attempt to avoid presenting an overwhelming amount of information about the systems. Every possible data structure and every possible modularization of functionality is not presented since they are numerous and not necessary to understanding aspects of the disclosure. For instance, data structures presented as multiple data structures can be organized differently with a variety of possible indexing/accessing schemes and arrangement of data. Similarly, the functionality presented as individual modules/engines/units in the example illustrations can also be organized differently in accordance with any one of platform (operating system and/or hardware), application ecosystem, interfaces, programmer preferences, programming language, etc. In addition, some functionality is described later in the description also as an attempt to avoid presenting an overwhelming amount of information. For instance, a snapshot request from a managing entity or a semi-sync configuration can lead to sequencing of multiple access requests at a primary managing storage element. Sequencing is not discussed in the early example illustrations.

FIGS. 1 and 2 depict example storage cluster synchronization engines coordinating a data change between primary and secondary logical storage objects in different clusters responsive to a change request. FIG. 1 depicts propagation of the change request from a primary managing storage element to a secondary managing storage element. Managing storage elements will be referred to hereafter as nodes for brevity. In FIG. 1, a first cluster includes a primary node 101 and a second cluster includes a secondary node 125. Entire clusters are not depicted for simplification of the figure and due to drawing space constraints. The primary node 101 is communicatively coupled with hosting storage elements that host a group 102 of logical storage objects. The group 102 includes a primary logical storage object. The primary node 101 includes a filesystem request generator 103, a change propagation engine 105, a storage cluster synchronization engine 123, and a filesystem 111. The filesystem request generator 103 generates a filesystem request from a storage protocol based request. The change propagation engine 105 includes an interceptor 107, a change propagator 109A, and a change propagator 109N. These modules in the primary node 101 access data depicted in FIG. 1 as sync mappings 115, in-flight tracking data 117, and in-flight tracking data 119. The sync mappings 115 indicate synchronization configurations among logical storage objects (also referred to herein as synchronization relationships or sync relationships). For example, a primary logical storage object can have a full sync relationship with one secondary logical storage object and a semi-sync relationship with another secondary logical storage object. In-flight tracking data tracks progress or state of requests from the perspective of corresponding change propagators. In other words, each change propagator instance maintains in-flight tracking data for the corresponding logical storage objects that have a sync relationship.

The secondary node 125 can include all of the same modules/engines as the primary node 101. In FIG. 1, some of the modules are not depicted to reduce repetition. The secondary node 125 is depicted as including a filesystem request generator 129, a storage cluster synchronization engine 139, a change propagation engine 131, and a filesystem 137. The change propagation engine 131 includes an interceptor 133 and a secondary writer 135. The secondary writer 135 of the secondary node 125 accesses data depicted in FIG. 1 as sync tracking data 134. The sync tracking data 134 indicates progress or state of requests from the perspective of the secondary writer 135. The sync tracking data 134 is not necessarily contained within the change propagation engine 131. The sync tracking data 134 is merely depicted near the secondary writer 135 for this description. The secondary node 125 is communicatively coupled with hosting storage elements that host a group 127 of logical storage objects. The group 127 includes a secondary storage object.

Although there may be some variation in functionality across different nodes, the functionality of modules having a same name will be generally the same in this illustration. The filesystem request generators 103, 129 generate filesystem requests based on storage protocol input/output (I/O) requests passed to the filesystem generators 103, 129. The filesystem generators 103, 129 can receive storage protocol I/O requests from a network stack, a small computer system interface (SCSI) stack, Internet SCSI (iSCSI) module, etc. Examples of storage protocol I/O requests include storage area network (SAN) requests and network attached storage (NAS) requests. The filesystem generators 103, 129 generate the filesystem requests based on the filesystem implemented on their node. The interceptors 107, 133 intercept requests from the filesystem request generators 103, 129. Intercepting can be implemented differently. An application programming interface can be modified so that the underlying functionality changes without changing the interface presented to callers. As another example, a monitoring process can monitor an execution queue and redirect a call when a specified address occurs in the execution queue. The filesystems 111, 137 access the underlying hosting storage element in accordance with filesystem requests. The storage cluster synchronization engines 123, 139, process communications in accordance with a protocol implemented via the network 110. As examples, the protocols implemented by the engines 123, 139 can be any one or more of Fibre Channel (FC), Fibre Chanel over Ethernet (FCoE), Internet Fibre Channel protocol (iFCP), and a tunneling protocol. Regardless of the specific protocol, the engines 123, 139 implement a protocol that supports an active connection that can be perceived as a direct connection between machines despite distance and hops between the machines.

FIG. 1 depicts example operations with a series of stages identified by the letters A-N. The suggested ordering of operations by the letters is limited to this illustrated example and should not be used to limit scope of the claims. At a stage A, the primary node 101 receives a change request 113. The change request 113 originates from a client that might be at a managing node (e.g., cluster manager), at a user node (e.g., a customer's server), etc. The filesystem request generator 103 processes the change request 113, generates a filesystem request based on the change request, and invokes code to pass the filesystem request 113 to the filesystem 111.

As part of generating the filesystem request 113, the filesystem request generator 103 translates the logical storage object identifier indicated as a target in the change request into filesystem location information of the logical storage object (e.g., Mode identifiers, offset, etc.). But the filesystem request generator 103 also indicates the logical storage object identifier to travel with the filesystem request. The logical storage object identifier can travel with the filesystem request in different manners. For example, a filesystem generator can write the logical object identifier into metadata of the filesystem request. As another example, a filesystem generator creates a data structure and associates it with the filesystem. Instead of the filesystem 111 receiving the filesystem request, the interceptor 107 receives the filesystem request at stage B. The request in its various forms (e.g., storage protocol I/O request, filesystem request, etc.) is no longer identified with the label 113 since the change being requested is the same despite the form of the request.

At stage C, the interceptor 107 accesses sync mappings 115 to determine any sync relationships relevant to the filesystem request. The filesystem request indicates a logical storage object in group 102 (in terms of the filesystem location information) that is a target of the filesystem request. The interceptor 107 accesses the sync mappings 115 to determine any sync relationships defined for the filesystem request target. The target may have a single sync relationship, multiple sync relationships, or no sync relationships. If the target has no sync relationships, then the filesystem request would be passed off to the filesystem 111. For this illustration, the sync mappings 115 indicate that the target has a full sync relationship with a logical storage object in the group 127. Since the target of the filesystem request has a sync relationship, the target of the filesystem request can be considered the primary logical storage object. As stated previously, the logical storage objects are identified by immutable identifiers that are exclusive at least across clusters that are associated with each other. The sync mappings, which may be indicated in one or more data structures, map the sync relationships across the levels or layers of the logical object or filesystem request target depending upon the logical object (e.g., file, LUN, etc.) and underlying filesystem. For example, the logical object may be a file. The logical object identifier will initially be the file identifier or file handle. The filesystem resolves a write request targeting the file handle to impacted data blocks. The filesystem may resolve through any number of Mode levels, for example. When there is a sync relationship, the sync mappings not only map the higher level identifier (i.e., the logical object identifier) at the primary node to the higher level identifier at the secondary node, but the sync mappings also map the lower level identifiers (i.e., filesystem location information). In this example case, the lower level identifiers would be the Mode identifiers. The primary node Mode identifiers for the part of the file being targeted would map to Mode identifiers on the secondary node for the part of the file being targeted.

At stage D, the interceptor 107 passes the filesystem request and an indication of the sync relationship for the target to the change propagator 109A. If the primary node 101 has not yet received a change request that targets the same primary logical storage object as indicated in the change request 113, then the interceptor 107 may invoke code that instantiates the change propagator 109A. Although not necessary, a change propagator is instantiated per primary logical storage object in this illustration. The interceptor 107 can indicate the sync relationship for the primary logical storage object to the change propagator in various manners. For example, the interceptor 107 can call a function that instantiates change propagators with the primary logical storage object identifier as a parameter value and the secondary logical storage object identifier as a parameter value. As another example, the interceptor 107 can send an inter-process communication to an already instantiated change propagator 109A along with a reference to the filesystem request stored in a local memory. To illustrate the per primary logical storage object instantiations of change propagators, the change propagator 109N is depicted with a dashed line to the in-flight tracking data 119. The dashed line is used to indicate that the change propagator 109N may be accessing the in-flight tracking data 119 for a different filesystem request.

At stage E, the change propagator 109A creates a filesystem request targeting the secondary logical storage object of the sync relationship and updates the in-flight tracking data 117. If the change propagator 109A has just been instantiated, then there may not yet be a structure for tracking data or there may be an empty structure. The change propagator 109A updates the in-flight tracking data 117 to indicate that a filesystem request targeting the primary logical storage object is in-flight (i.e., will be sent or is being sent). The change propagator 109A updates the in-flight tracking data 117 to also indicate that a filesystem request targeting the secondary logical storage object is in-flight. The change propagator 109A then (or concurrently) creates the request with an identifier of the secondary logical storage object that has a full sync relationship with the primary logical storage object. The change propagator 109A creates this filesystem request with a different requestor as well. The change propagator 109A indicates the change propagator 109A as the requestor. The change propagator 109A can be identified with various data that exclusively identifies the change propagator 109A within any associated clusters, such as a combination of a process/thread identifier of the change propagator 109A and a network address of the primary node 101. The change propagator 109A can also incorporate the primary logical storage object identifier into the indication of the requestor. The filesystem request targeting the primary logical storage object sent from the change propagator 109A will be referred to as the primary change request. The filesystem request targeting the secondary logical storage object sent from the change propagator 109A will be referred to as the secondary change request.

At stage F, the change propagator 109A sends the filesystem requests for servicing. Because the primary logical storage object has a full sync relationship with the secondary logical storage object, the primary node 101 will not respond to the change request 113 until the change has been made at both the primary and secondary logical storage objects. Therefore, the change propagator 109A can send the primary and secondary change requests in any order. The change propagator 109A sends the primary change request to the filesystem 111. The change propagator 109A sends the secondary change request to the storage cluster sync engine 123. After the change requests are passed from the change propagator 109A, timing of the operations can vary depending on network conditions, differences in node capabilities, etc.

At stage G, the filesystem 111 accesses the hosting storage element.

At stage H, the storage cluster sync engine 123 processes the secondary change request in accordance with a protocol of a connection between the storage cluster sync engine 123 and the storage cluster sync engine 139 that traverses the network 110. The storage cluster sync engine 123 can construct a new request in accordance with the connection protocol and populate the new request with the relevant information from the secondary change request (e.g., secondary logical storage object identifier, data to be written, etc.). The storage cluster sync engine 123 may encapsulate the secondary change request with a header compliant with the connection protocol. For this illustration, the sync mappings at the primary node map logical object identifiers (e.g., file handles) between the primary node and the secondary node as well as map the filesystem location information (e.g., Mode identifiers). The secondary change request is constructed with the secondary node filesystem location information of the data blocks impacted by the change request. In some cases, the filesystem location information sync mappings will be separate from the logical object identifier sync mappings. And the filesystem location information sync mappings may be maintained at the secondary node. In those cases, the secondary change request is constructed with indications of the targeted logical object and the filesystem location information of the primary node. When received, the secondary node will access the sync mappings and resolve the primary node filesystem location information to the secondary node filesystem location information.

At stage I, the storage cluster sync engine 139 processes the received request in accordance with the connection protocol and passes the secondary change request to the secondary writer 135. The storage cluster sync engine 139 may reconstruct the secondary change request from the received request or extract the secondary change request from the received request. If no secondary change requests have been received yet, the storage cluster sync engine 139 may invoke code to instantiate the secondary writer 135. The storage cluster sync engine 139 can instantiate a secondary writer to handle all secondary change requests received by the storage cluster sync engine 139 or instantiate them per primary logical storage object and secondary logical storage object pair.

FIG. 1 depicts dashed lines from the filesystem request generator 129 and from the interceptor 133. The dashed line from the filesystem request generator 129 indicates the possibility that the filesystem request generator 129 is receiving, processing, and passing other change requests to the interceptor 133. The dashed line from the interceptor 133 to the ellipsis illustrates the possibility that the interceptor 133 is intercepting and passing change requests to change propagators of the secondary node 125 that are not depicted. These possibilities are illustrated to show that the secondary node 125 is not limited to handling secondary change requests.

At stage J, the secondary writer 135 updates sync tracking data 134. The secondary writer 135 records indications of the secondary change request that at least include the targeted secondary logical storage object, the requestor (i.e., the change propagator 109A), and state of the secondary change request. At this point, the secondary writer 135 records state as in-flight since the secondary change request is being or will be sent. At stage K, the secondary writer 135 sends the secondary change request to the filesystem 137.

At stage L, the filesystem 137 accesses a hosting storage element in accordance with the secondary change request.

FIG. 2 depicts responses to the primary and secondary change requests processed in accordance with the full sync relationship defined in the sync mappings of FIG. 1. FIG. 2 depicts example operations with stage labels A-L. The stages A-J are depicted as if the response from the hosting storage element of the primary logical storage object responds before the secondary node 125. However, that ordering is not necessary. In some cases, the secondary node 125 may be able to respond to the change propagator 109A before the hosting storage element of the primary logical storage object can respond to the primary node 101. Regardless of the timing of responses, a response to the requestor is not provided until changes at both the primary and secondary logical storage objects have been confirmed by the change propagator 109A. Some elements from FIG. 1 have been removed to simplify FIG. 2.

Stages A-C illustrate a response traveling from the hosting storage element of the primary logical storage object to the change propagator 109A and a corresponding update of the in-flight tracking data 117. At stage A, a hosting storage element that hosts the primary logical storage object supplies a response to the filesystem 111. The filesystem 111 forwards the response to the change propagator 109A at stage B. At stage C, the change propagator 109A updates the in-flight tracking data 117 to indicate that the primary change request has been performed in the primary logical storage object.

Stages D-J illustrate a response traveling from the hosting storage element of the secondary logical storage object to the change propagator 109A and a corresponding update of the in-flight tracking data 117. At stage D, a hosting storage element that hosts the secondary logical storage object supplies a response to the filesystem 137. The filesystem 137 forwards the response to the secondary writer 135 at stage E. At stage F, the secondary writer 135 updates the sync tracking data 134 to reflect the update to the secondary logical storage object. For example, the secondary writer 135 uses a combination of the secondary logical storage object identifier and the requestor of the forwarded response to look up an entry in a structure that hosts the sync tracking data 134. The secondary writer 135 sets a value or flag in the entry to indicate that the change has been completed to the secondary logical storage object. The secondary writer 135 then forwards the response to the storage cluster synchronization engine 139. The storage cluster synchronization engine 139 determines that the response to the secondary change request ("secondary response") is to be sent to the primary node 101. The storage cluster synchronization engine 139 processes the secondary response in accordance with the connection protocol and sends the secondary response over the connection via the network 110 at stage H. At stage I, the storage cluster synchronization engine 123 processes the secondary response in accordance with the connection protocol and forwards the secondary response to the change propagator 109A. As part of processing the secondary response, the storage cluster synchronization engine 123 can determine that the secondary response should be sent to the change propagator 109A based on the requestor identifier that incorporates a process/thread identifier of the change propagator 109A. At stage J, the change propagator 109A updates the in-flight tracking data 117 to indicate that the secondary change request has been performed in the secondary logical storage object.

After determining that all outstanding change requests corresponding to the initial change request 113 have been completed, the change propagator 109A supplies a response to the filesystem request generator 103. Each time the change propagator 109A updates the in-flight tracking data 117, the change propagator 109A can read the entry to determine whether all requests indicated in the entry have been completed or are still in-flight, for example. For this illustration, the filesystem request generator 103 maintains data that indicates the requestor that corresponds to the change request 113. When a request is initially received by the filesystem request generator 103, the request can be tagged with a request identifier that corresponds to the requestor. This request identifier can travel with the request and corresponding response. The request identifier indicates an identity of the requestor and the request to distinguish it from other requests from the same requestor. The change propagation engine 105 can be programmed to also (or instead of) maintain data that indicates the requestor of the change request 113 and that indicates the change request 113 itself. At stage L, the filesystem request generator 103 forms a change response 213 and supplies the change response 213 to the corresponding requestor.

FIGS. 1 and 2 describe systems and operations for propagating changes to data that is maintained and replicated across different nodes in a clustered storage environment. It will be appreciated in certain instances, there can be a failure or other anomaly that can cause a change request to not be completed on a node. FIGS. 3-7 below describe various aspects of the disclosure that reconcile data in the event of a failure or anomaly that potentially causes data to become unsynchronized across nodes in a cluster. The discussion below will be presented in the context of the systems described above in FIGS. 1 and 2. However it should be noted that the aspects described below may be applied to other data storage environments beyond those described above and are not limited to the system environments described above.

Figure 3:
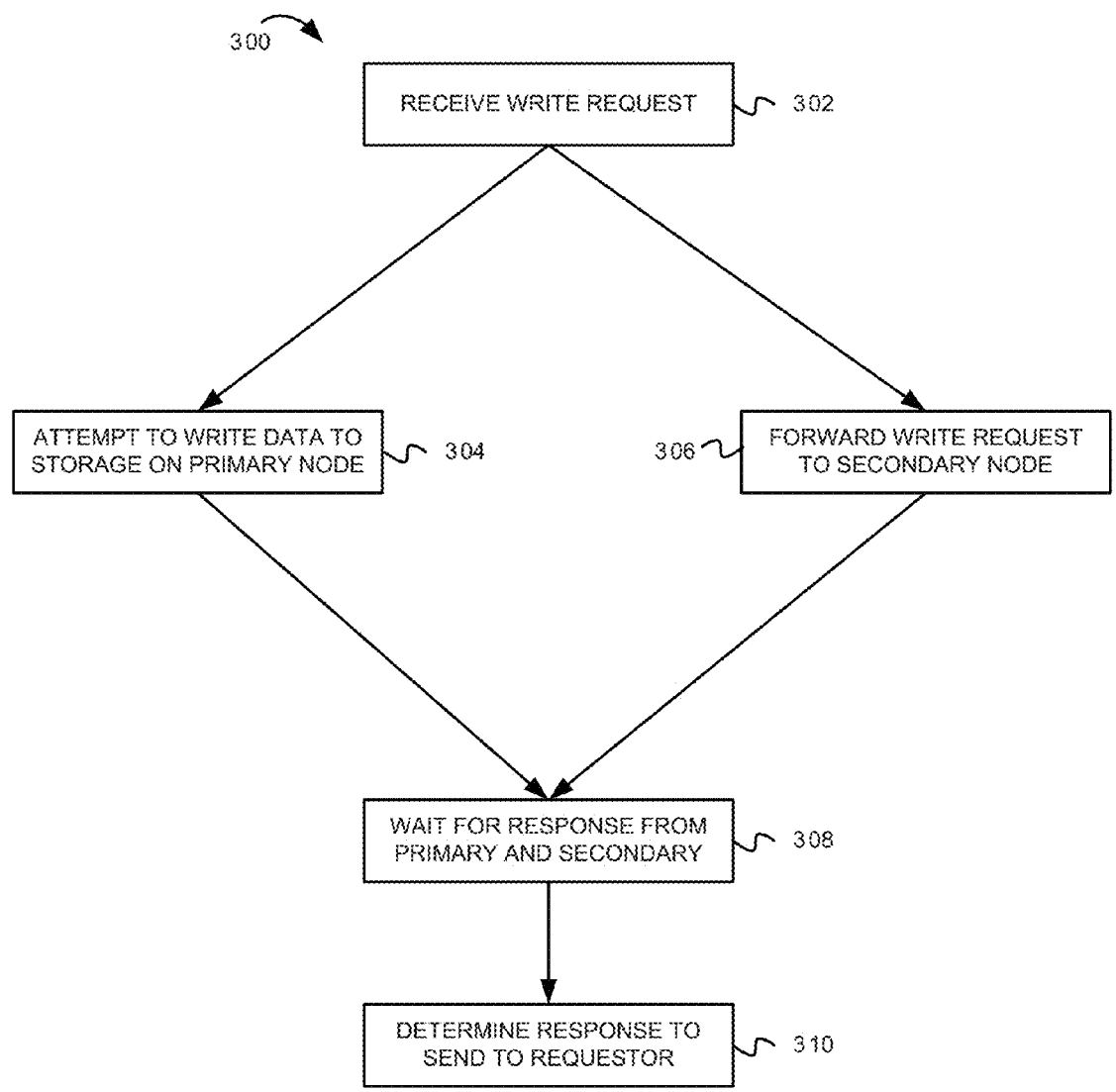
FIG. 3 is a flow chart illustrating example operations for synchronizing replication of data across nodes in a networked storage system.

FIG. 3 is a flow chart 300 illustrating example operations for synchronizing replication of data across nodes in a networked storage system. At block 302, a node receives a write request. The request can originate from a client that might be at a managing node (e.g., cluster manager), at a user node (e.g., a customer's server), etc. A write request can be any type of request that results in data changing on a storage device in the networked storage system. For example, a node 101 (FIG. 1) may receive a request to write data for a primary logical storage object stored on a storage device coupled to node 101 that may be in a full-sync or semi-sync relationship with a secondary logical storage object stored on a storage device coupled to node 125 (FIG. 1). The node receiving the request (e.g., node 101) is referred to as a primary node.

At block 304, the primary node attempts to write the data received as part of the write request to the primary logical storage object on storage that is coupled to the primary node. The data received as part of the write request for a target location on a storage unit may be referred to as "new data", while the data currently at the target location may be referred to as "old data." According to some aspects, some or all of the write operations described above with respect to stages A-H of FIG. 1 can be performed as part of writing the data.

At block 306, the primary node forwards the write request to a node hosting a secondary logical storage object, referred to as a secondary node. The secondary node replicates data written to the primary logical storage object on the primary node to the secondary logical storage object on the secondary node. According to some aspects, some or all of the operations described above with respect to stages I-K of FIG. 1 can be performed on the secondary node.

The processing associated with the operations of blocks 304 and 306 may take place in parallel. That is, the operations may be performed at substantially the same time.

At block 308, the primary node waits for responses to the operations initiated at blocks 304 and 306. In particular, the primary node waits for a response from the storage subsystem coupled to the primary node indicating whether or not the data in the write request was successfully written to the primary logical storage object on the storage that is coupled to the primary node. Similarly, the primary node waits for a response from the secondary node indicating whether or not the write request was successfully processed by the secondary node (i.e., the data in the write request was successfully written to the secondary logical storage object on the storage coupled to the secondary node). For example, a change propagator (e.g., change propagator 109A) waits for the responses to the operations initiated at blocks 304 and 306. According to some aspects, the change propagator can perform some or all of the operations described above with respect to stages A-K of FIG. 2.

At block 310, the primary node determines a combined response that is to be provided to the requestor of the write request received at block 302. According to some aspects of the disclosure, the combined response is determined based, at least in part, on the status of the write requests issued at blocks 304 and 306. Table 1 illustrates example combined responses according to aspects of the disclosure, where the combined response is based on possible outcomes of the requests issued at blocks 304 and 306.

TABLE 1

| Primary Write | Secondary Write | Combined |
| --- | --- | --- |
| Success | Success | Success |
| Success | Fail | Secondary Error |
| Fail | Success | Error |
| Fail | Fail | Error |

Thus when both the primary node and secondary node successfully process the write request, a success indication can be returned to the requestor. Similarly, when both the primary node and secondary node fail to process the request, an error indication can be returned to the requestor. In some aspects, the error condition that is returned is an indication of the error associated with the primary node.

In the case that the primary node fails to process the request, but the secondary node successfully processes the request, an error indication can be returned to the requestor. In some aspects, the error condition that is returned is an indication of the error associated with the primary node. In response to the error, the primary node may initiate reconciliation operations. Further details on reconciliation operations associated with failure of a primary node are provided below with respect to FIG. 4.

In the case that the primary node successfully processes the request, but the secondary node fails to process the request, a secondary error indication may be returned to the requestor. Returning a secondary error indication to the requestor provides the ability for the requestor to determine any potential recovery actions. Additionally, the error may be the result of the secondary node having failed or become unreachable on the network. Thus resources expended to attempt to synchronize data from the primary to the secondary may be wasted. Further details on replication operations associated with failure of a secondary node are provided below with respect to FIG. 5.

The wait for responses from both the primary and secondary nodes that occurs at block 308 can be desirable, as doing so can prevent race conditions from developing. For example, assume that the secondary node successfully processes the request and returns a response to the primary node before the result of primary node's write is known. If the primary node were to forward the success response associated with the secondary node to the requestor and the primary node later fails to process the write request, a host may issue a subsequent read request assuming that the data on the primary node was successfully written. However, instead of receiving the new data, the requestor will receive data previous to the new data because the new data was not successfully written on the primary node.

Figure 4:
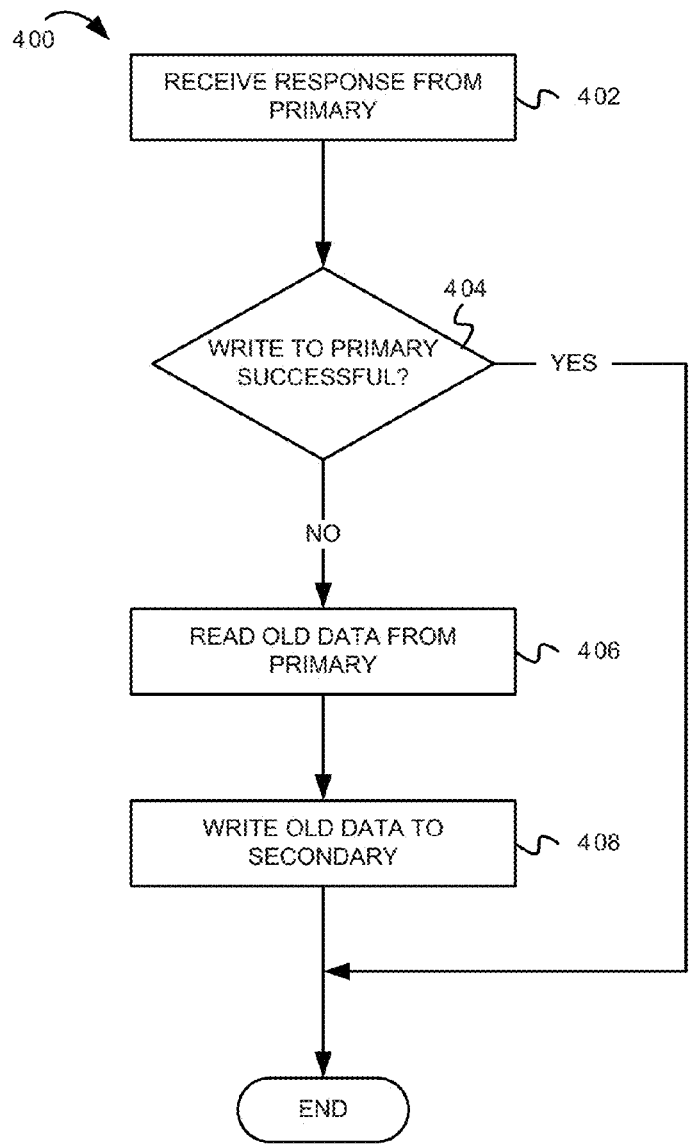
FIG. 4 is a flow chart illustrating example operations for synchronizing replication of data across nodes in a networked storage system in response to a primary node failure.

FIG. 4 is a flow chart 400 illustrating example operations for synchronizing replication of data across nodes in a networked storage system in response to a primary node failure. At block 402, a response to a write request issued to a storage subsystem of the primary node is received by the primary node.

At block 404, a check is made to determine if the response indicates that data in the write request was successfully written by the storage subsystem. If the response indicates that the data was successfully written, the method ends.

If the response indicates that the storage subsystem on the primary node failed to write the data in the write request, the data for the primary logical storage object on the storage unit managed by the primary node may need to be reconciled with the data for the secondary logical storage object on the storage unit managed by the secondary node. At block 406, the primary node reads from the storage subsystem the old data from the storage unit on the primary node at the location that was intended to be overwritten by the data in the write request.

At block 408, a request to write the old data is issued from the primary node to the secondary node. The request to write the old data to the secondary node prevents the data on the primary node and secondary node from being divergent. For example, in the case that the secondary node successfully processes a write request and the primary node fails to process a write request, the primary node will continue to store old data while the secondary node will store new data. Replicating the old data to the secondary node prevents the data from being divergent on the primary node and secondary node, thereby reconciling the data for the primary logical storage object with the data for the secondary logical storage object.

Figure 5:
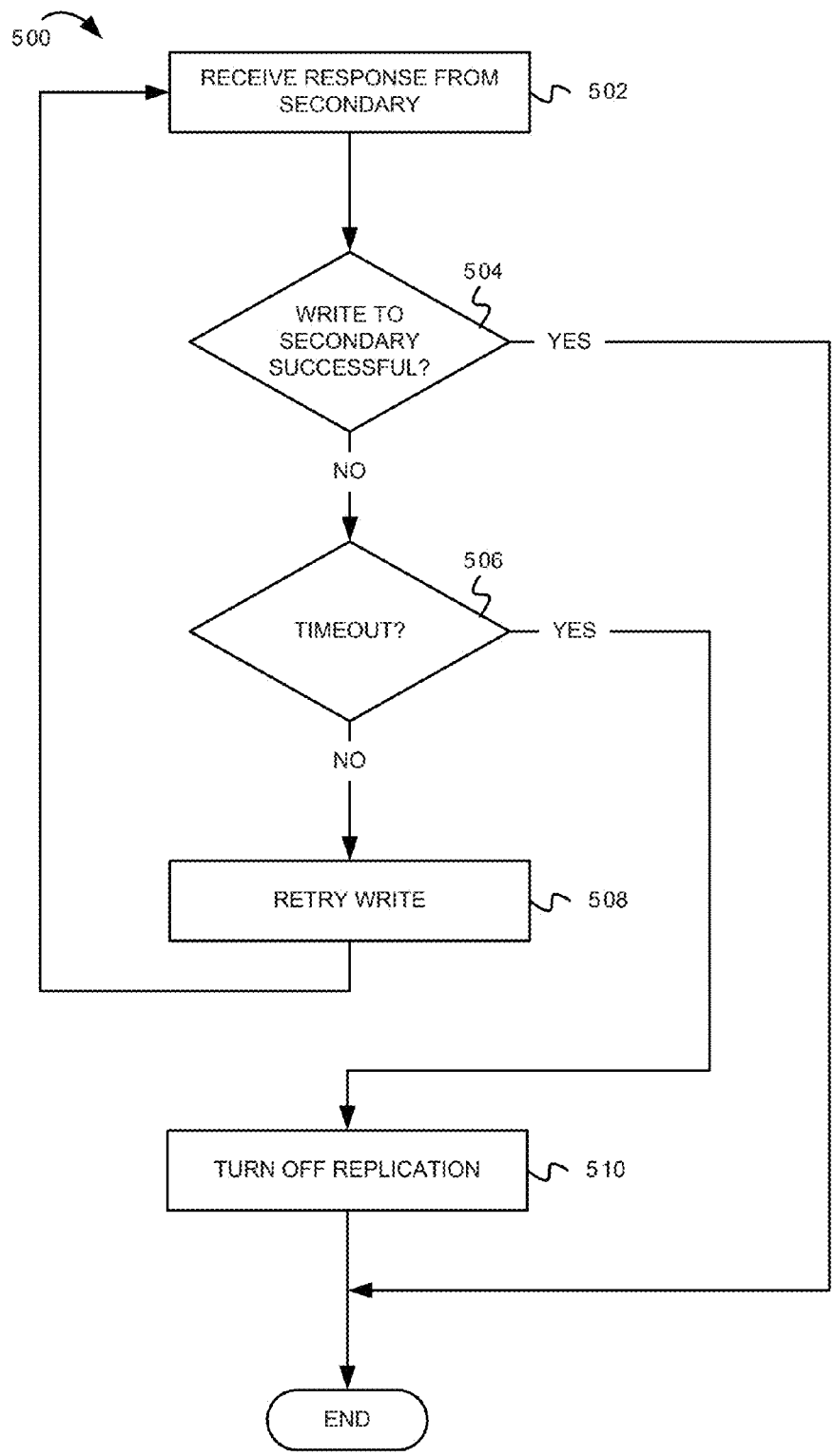
FIG. 5 is a flow chart illustrating example operations for synchronizing replication of data across nodes in a networked storage system in response to a secondary node failure.

FIG. 5 is a flow chart 500 illustrating example operations for synchronizing replication of data across nodes in a networked storage system in response to a secondary node failure. At block 502, a primary node receives a response from a secondary node indicating whether or not a write request issued by the primary node to replicate the data on the secondary node was successfully processed by the secondary node.

At block 504, a check is made to determine if the response indicates the secondary node successfully processed the write request. If the secondary node successfully processed the write request, the method ends.

If the write request was not successfully processed by the secondary node, then at block 506 a check is made to determine if a timeout value is present and if the timeout value has been exceeded. If a timeout value exists and has been exceeded, then in some aspects, at block 510 the primary node turns off replication of data to the secondary. In alternative aspects, the primary node can return an error code to the requestor indicating that the secondary node failed to write the data in the request.

If the check at block 506 determines that a timeout value has not been exceeded, then at block 508 the primary node can cause the secondary node to retry the write request. The method then returns to block 502 to determine the result of the retried write request.

Figure 6:
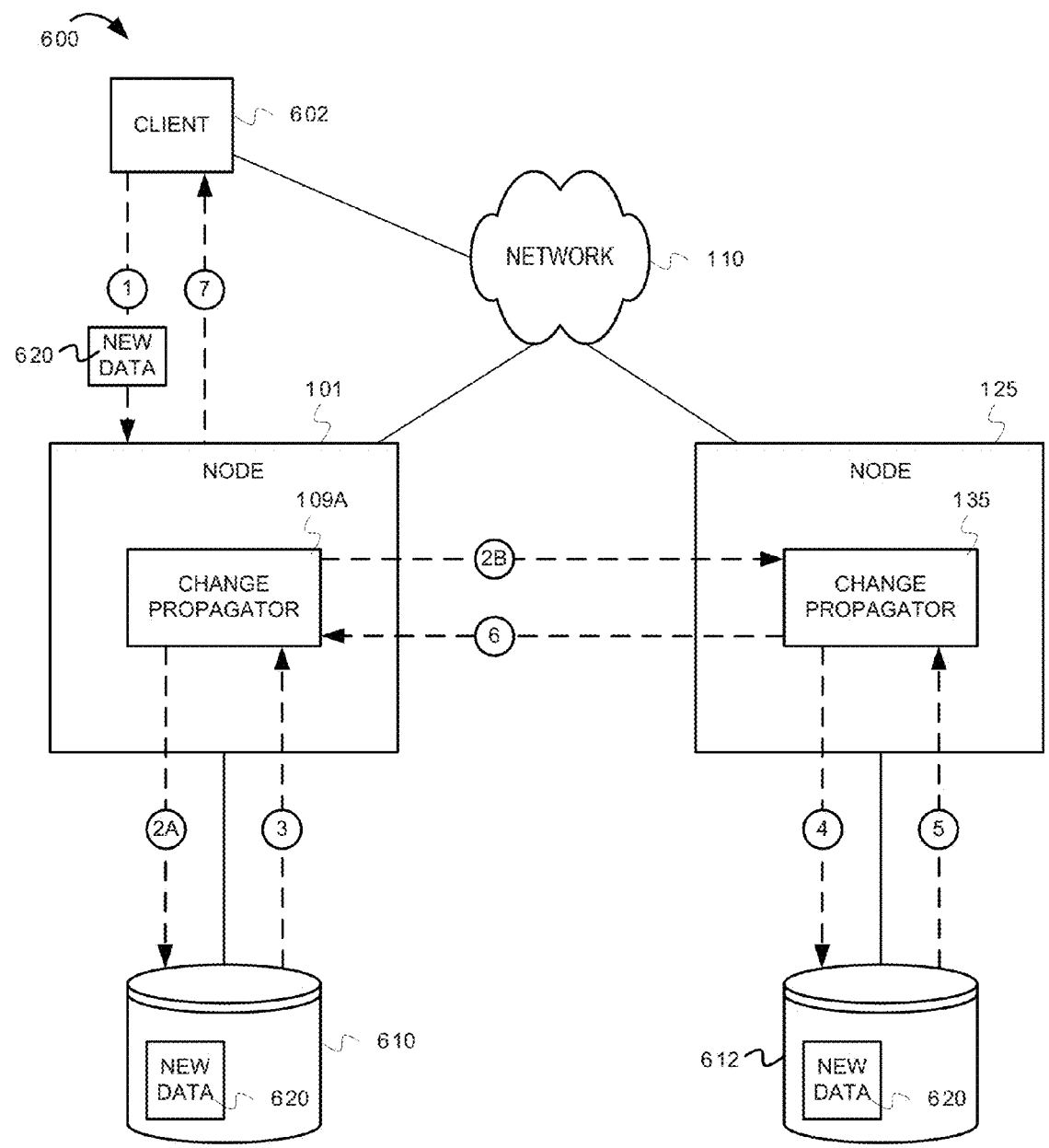
FIG. 6 is a block diagram illustrating replication of data across nodes in a networked storage system.

FIG. 6 is a block diagram illustrating an example of synchronization of replicated data across nodes in a networked storage system 600 according to the methods described above. System 600 includes a client 602, node 101 (e.g., a primary node), node 125 (e.g., a secondary node), a storage unit 610 coupled to node 101 and a storage unit 612 coupled to node 125. Storage unit 610 may be a storage unit that hosts a group 102 of logical storage objects that includes a primary logical storage object (FIG. 1). Similarly, storage unit 612 may be a storage unit that hosts a group 127 of logical storage objects that includes a second logical storage object that is in a full-sync or semi-sync relationship with the primary logical storage object. In FIG. 6, various operations or requests are indicated by dashed lines. In the example illustrated in FIG. 6, a client 602 issues a write request (operation 1) to write new data 620 for a primary logical storage object to the networked storage system. As indicated above, the primary logical storage object may be in a full-sync or semi-sync relationship with a secondary logical storage object stored on storage unit 612 on node 125.

Node 101 receives the request and in some aspects, a change propagator on node 101 (e.g., change propagator 109A) issues a write request (operation 2A) to a storage subsystem to write the new data to storage unit 610 coupled to node 101. In addition, node 101 issues a write request (operation 2B) to node 125 to cause node 125 to replicate the new data 620 to a storage unit 612.

The change propagator (e.g., change propagator 109A) on node 101 then waits for responses from the storage subsystem and the secondary node 125 regarding the success/failure of the requests. For example, the change propagator can receive a response (operation 3) from a storage subsystem controlling storage unit 610. The various responses can be stored in in-flight tracking data (e.g., in-flight tracking data 117) maintained by the change propagator.

Secondary node 125 receives the write request (operation 2B) and secondary writer 135 issues a write request (operation 4) to a storage subsystem coupled to node 125 to write new data 620 to storage unit 612. Secondary writer 135 can receive a response (operation 5) from the storage subsystem regarding the success/failure of the request. The response is then relayed (operation 6) from secondary writer 135 to the change propagator (e.g., change propagator 109A) that issued the request.

After the responses from operations 3 and 6 have been received, the change propagator determines a combined response to send (operation 7) to client 602 so that client 602 can be informed of the success or failure of the request issued at operation 1. For example, the change propagator may access in-flight tracking data 117 to determine whether the responses have been received and to determine what the combined response should be. As discussed above, the combined response may be determined based on the responses received from the storage subsystem local to the primary node 101 and the response received from the secondary node 125.

In the example illustrated in FIG. 6, both requests at operations 2A and 2B were successful, resulting in new data 620 being written to both the primary logical storage object on storage unit 610 and the secondary logical storage object on storage unit 612. As a result, the new data 620 is successfully replicated.

It should be noted that processing associated with operations 2A and 3 can be performed in parallel, i.e., substantially contemporaneously with the processing associated with operations 2B and 4-6. Further, some of the operations may complete in a different order than indicated in FIG. 6.

For example, operation 6 may complete before operation 3. That is, the response received by primary node 101 from secondary node 125 at operation 6 may come before, after, or substantially simultaneously with, the response received from a storage subsystem coupled to node 101 at operation 3.

Figure 7:
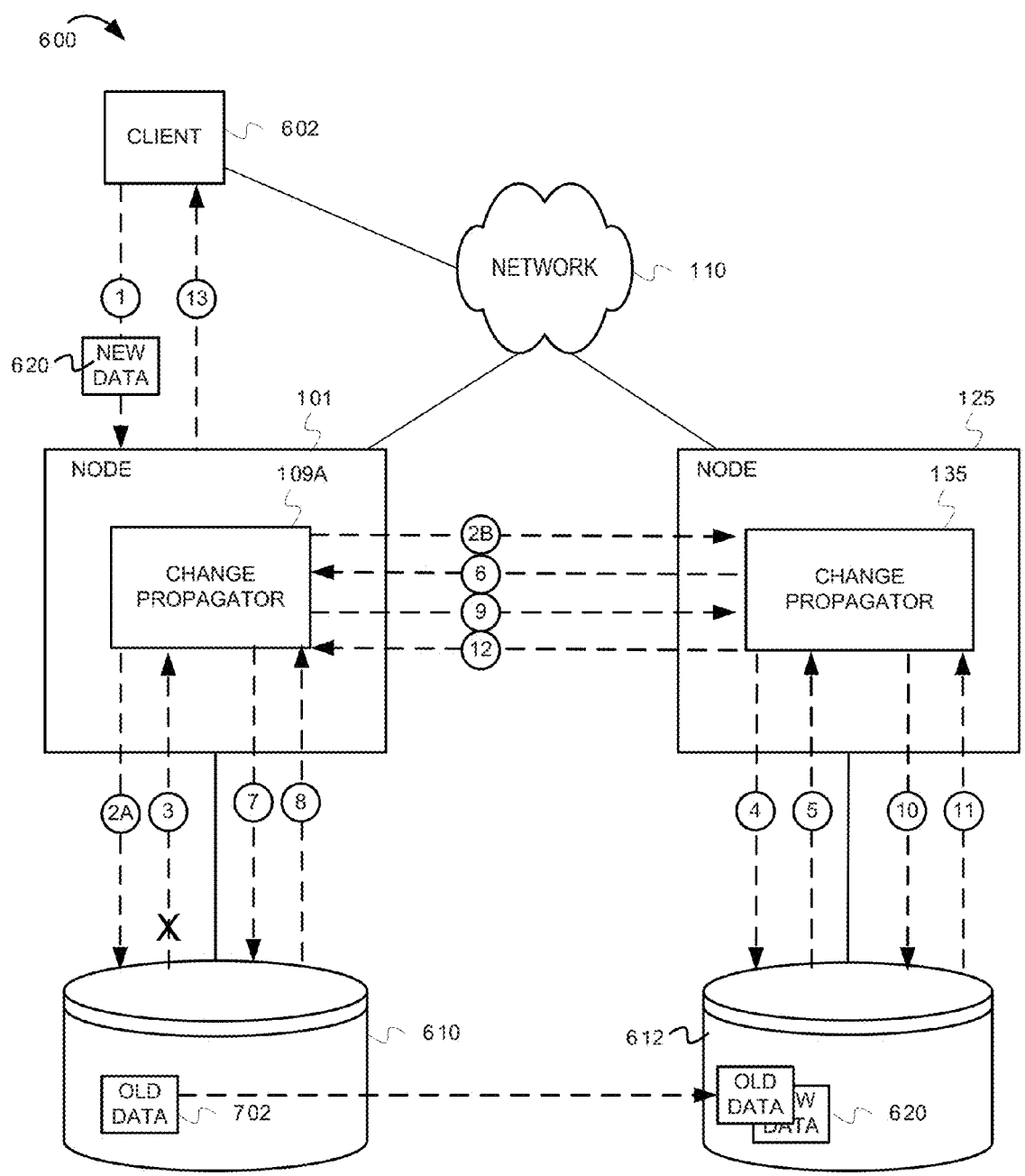
FIG. 7 is a block diagram illustrating replication of data across nodes in response to a primary node failure.

FIG. 7 is a block diagram illustrating an example reconciliation of replicated data across nodes in response to a primary node failure in networked storage system 700. The example illustrated in FIG. 7 starts, like that illustrated in FIG. 6, with the node 101 receiving a write request for a logical storage object from the client 602. A change propagator on the primary node 101 (e.g., change propagator 109A) issues write requests to a storage subsystem on the primary node that controls a storage unit hosting the primary logical storage object (operation 2A) and to secondary node 125 (operation 2B).

In the example illustrated in FIG. 7, the write request at operation 2A fails. The reason for the failure can vary. For example, the storage unit 610 may have failed, may be full, may be experiencing temporary connectivity problems, or may have exhausted all memory buffer space to process the write request. Storage unit 610 thus sends a response (operation 3) indicating that the write request was not successfully processed. Because of the failure to write the new data 620, storage unit 610 retains old data 702 at the location that was the target of the write request.

Continuing with the example, the write request issued to node 125 at operation 2B is processed, and new data 620 is written (operation 4) to the secondary logical storage object at the target location on storage unit 612. Storage unit 612 issues a response (operation 5) indicating that the new data 620 has been successfully written. Secondary writer 135 issues a response (operation 6) indicating that the write request was successfully processed.

Upon receiving the responses from storage subsystem local to the primary node (operation 3) and from the secondary node (operation 6), the change propagator determines that the data on storage unit 610 of the primary node 101 and the data on storage unit 612 on the secondary node 125 is divergent, that is, the data has not been replicated. In response to the detection that the data is divergent, the change propagator (e.g., change propagator 109A) begins operations to reconcile the data on the storage unit 610 and the storage unit 612.

The change propagator issues a read request (operation 7) to read the old data 702 at the location on storage unit 610 that was the target of the write request. The change propagator receives the old data (operation 8) in response to the request. The change propagator then issues a write request (operation 9) including the old data 702 to the secondary node 125. Secondary writer 135 of secondary node 125 writes the old data included in the request (operation 10) to storage unit 612, thus overwriting new data 620 with old data 702. The storage 612 unit then responds (operation 11) with the results of the write operation. In the example illustrated in FIG. 7, the write is successful and the old data 702 overwrites the divergent new data 620. At this point, the data on storage unit 610 on primary node 101 and on storage unit 612 on secondary node 125 is synchronized and no longer divergent. In other words, the data on storage unit 612 replicates the data on storage unit 610.

The secondary node 125 then responds (operation 12) to the change propagator on primary node 101 with the results of the overwrite operation (operation 9). The change propagator then issues a response (operation 13) to the client 602 indicating that the write request failed.

The discussion above has been presented in the context of a client issuing a write request that includes data that is to be replicated on two or more multiple storage devices. Alternative aspects of the disclosure include synchronizing other types of requests. For example, an abort request can be synchronized across multiple storage devices, storage controllers, or storage subsystems. In some instances, a client may issue a request to abort one or more previously issued requests. For example, in response to an error received as a result of a write request, a client may determine that any other pending requests are to be aborted. Because the pending requests may have been distributed to multiple storage controllers, storage subsystems, or storage devices, it is desirable to synchronize the abort request. Thus in some aspects, an abort request received by a primary node (e.g., node 101) to abort a write directed to a primary logical storage object can be processed on the node and also forwarded to a secondary node hosting a secondary logical storage object (e.g., node 125) for processing. The responses to the abort request can be received by a change propagator and used to determine whether data reconciliation is required and a response to provide to the requestor of the abort. Table 2 is a table providing a response to a write request when a requestor has requested that the write be aborted. In addition, Table 2 indicates whether reconciliation is attempted.

TABLE 2

| Primary Status | Secondary Status | Reconciliation Attempted | Response to Requestor |
| --- | --- | --- | --- |
| aborted | aborted | no | aborted |
| aborted | written | yes | aborted |
| written | aborted | yes | written |
| written | written | no | written |

As can be seen from Table 2, the two cases where the responses from the primary and secondary nodes match result in the response being provided to the client. In other words, if both the primary and the secondary successfully abort a write request, the response to the client is that the requested write operation was successfully aborted. Similarly, if both the primary and secondary nodes write the data before the request can be aborted, the response to the client is that the data has been written indicating that the request was not aborted.

In cases where the responses differ, reconciliation between the primary node and the secondary node can be attempted. For example, if the primary node indicates that the request was aborted, and the secondary node indicates that the data was written, then a reconciliation process as described above can cause the old data on the primary node to be provided to the secondary node so that the old data overwrites the new data, thereby bringing the primary node and secondary node into a synchronized state with respect to data replication. In particular, the old data for a primary logical storage object can be provided to the secondary node for use in overwriting the new data in the secondary logical storage object with the old data of the primary logical storage object. In this case, the response to the client is that the request was successfully aborted because the new data is not written to the primary node and the new data was overwritten on the secondary node with the old data still present on the primary node.

Alternatively, if the response indicates that the primary node has written the data and the secondary node aborted the request, then the new data on the primary node can be supplied to the secondary node, thereby bringing the primary node and secondary node into a synchronized state with respect to data replication. In this case, the response issued to the client will be that the data has been written before the abort could be accomplished, because the new data exists on both the primary node and the secondary node.

It should be noted that the case where the primary node and secondary node are divergent and where the primary node stores newly written data is handled differently in the abort request situation vs. a write failure situation. As discussed above, if the reason that the secondary node fails to write the data is due to an error such as a network connectivity error or a failure on the secondary node, it is unlikely that a reconciliation attempt will succeed. In the abort case, the secondary node is still likely to be able to process a write request, so a reconciliation attempt is likely to succeed. Thus reconciliation is attempted.

As will be appreciated by one skilled in the art, aspects of the disclosure may be implemented as a system, method or computer program product. Accordingly, aspects of the disclosure may take the form of a hardware aspect, a software aspect (including firmware, resident software, micro-code, etc.) or an aspect combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the disclosure are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the aspects of the disclosure are described with reference to various implementations and exploitations, it will be understood that these aspects are illustrative and that the scope of the inventive subject matter is not limited to them. In general, techniques for synchronizing replicated data across nodes in a networked storage system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components.

These and other variations, modifications, additions, and improvements may fall within the scope of the inventive subject matter.

What is claimed is:

1. A method comprising:
receiving, by a first node, a first request to write data to a first storage unit coupled to the first node;
performing a first write operation to the first storage unit;
replicating the first request to a second node as a replicated first request, wherein the replicated first request causes the second node to perform a second write operation to write the data to a second storage unit coupled to the second node;
performing a failure reconciliation based upon the first write operation failing, the failure reconciliation comprising:
reading old data from a location within the first storage unit targeted by the first write operation, wherein the old data was previously received by the first node from the second node; and
sending a reconciliation request, comprising the old data, to instruct the second node to overwrite the data, written to the second storage unit, using the old data;
receiving a second request to abort the first request;
performing a first abort operation on the first node based upon the second request;
forwarding the second request to the second node to invoke the second node to perform a second abort operation;
determining a combined response based upon a first result of the first write operation and a second result of the second write operation; and
performing a reconciliation operation in accordance with the combined response.

2. The method of claim 1, comprising:
determining that data at the first storage unit is different from data at the second storage unit; and
performing a reconciliation to synchronize the data at the first storage unit and the data at the second storage unit.

3. The method of claim 1, wherein old data overwrites data, stored on the second storage unit, based upon the reconciliation operation.

4. The method of claim 1, comprising:
determining that the second write operation failed to write the data to the second storage unit.

5. The method of claim 4, comprising:
terminating data replication between the first node and the second node.

6. The method of claim 1, comprising:
determining that the first abort operation failed and the second abort operation succeeded;
reading first data from the first storage unit; and
forwarding the first data to the second node to invoke the second node to overwrite second data on the second storage unit with the first data.

7. The method of claim 1, comprising:
determining that the first abort operation succeeded and the second abort operation failed;
reading first data from the first storage unit; and
forwarding the first data to the second node to invoke the second node to overwrite second data on the second storage unit with the first data.

8. A non-transitory machine readable medium having stored thereon instructions for performing a method comprising program code which when executed by a machine, causes the machine to:
receive, by a first node, a first request to write data to a first storage unit coupled to the first node;
perform a first write operation to the first storage unit;
replicate the first request to a second node as a replicated first request, wherein the replicated first request causes the second node to perform a second write operation to write the data to a second storage unit coupled to the second node;
receive, by the first node, a second request to abort the first request;
perform a first abort operation on the first node based upon the second request;
forward the second request to the second node to invoke the second node to perform a second abort operation;
determine a combined response based upon results of the first abort operation and the second abort operation; and
perform a reconciliation operation in accordance with the combined response.

9. The non-transitory machine readable medium of claim 8, wherein the program code causes the machine to:
determine that the first write operation failed to write the data; and
read, by the first node, old data from a location targeted by the first write operation and forward the old data to the second node.

10. The non-transitory machine readable medium of claim 9, wherein the program code causes the machine to:
instruct the second node to write the old data, wherein the old data overwrites data stored on the second storage unit.

11. The non-transitory machine readable medium of claim 8, wherein the program code causes the machine to:
determine that the second write operation failed to write the data to the second storage unit; and
terminate data replication between the first node and the second node.

12. The non-transitory machine readable medium of claim 8, wherein the first request is to write the data for a first logical storage object at the first storage unit and the second write operation is to write the data for a second logical storage object at the second storage unit.

13. The non-transitory machine readable medium of claim 8, wherein the program code causes the machine to:
determine that the first abort operation failed and the second abort operation succeeded;
read first data from the first storage unit; and
forward the first data to the second node to invoke the second node to overwrite second data on the second storage unit with the first data.

14. The non-transitory machine readable medium of claim 8, wherein the program code causes the machine to:
determine that the first abort operation succeeded and the second abort operation failed;
read first data from the first storage unit; and
forward the first data to the second node to invoke the second node to overwrite second data on the second storage unit with the first data.

15. A device comprising:
a memory containing machine readable medium comprising program code having stored thereon instructions for performing a method; and
a processor coupled to the memory, the processor configured to execute the program code to cause the processor to:
receive, by a first node, a first request to write data for a first logical storage object to a first storage unit coupled to the first node;

perform a first write operation to a first location on the first storage unit;

replicate the first request to a second node as a replicated first request, wherein the replicated first request causes the second node to perform a second write operation to write the data to a second location for a second logical storage object on a second storage unit coupled to the second node;

perform a failure reconciliation based upon the first write operation failing, the failure reconciliation comprising:

reading old data from a location within the first storage unit targeted by the first write operation, wherein the old data was previously received by the first node from the second node; and sending a reconciliation request, comprising the old data, to instruct the second node to overwrite the data, written to the second storage unit, using the old data;

receive a second request to abort the first request;

perform a first abort operation on the first node based upon the second request;

forward the second request to the second node to invoke the second node to perform a second abort operation;

determine a combined response based upon a first result of the first write operation and a second result of the second write operation; and perform a reconciliation operation in accordance with the combined response.

16. The device of claim 15, wherein the program code causes the processor to:

determine that data at the first location is different from data at the second location; and perform a reconciliation to synchronize the data at the first location and the data at the second location.

17. The device of claim 15, wherein the program code causes the processor to:

instruct the second node to write old data, wherein the old data overwrites the data stored at the second location on the second storage unit.

18. The device of claim 15, wherein the program code causes the processor to:

determine that the second write operation failed to write the data to the second storage unit.

19. The device of claim 18, wherein the program code causes the processor to:

terminate data replication between the first node and the second node.

20. The device of claim 15, wherein the program code causes the processor to:

determine that the first abort operation failed and the second abort operation succeeded;

read first data from the first storage unit; and forward the first data to the second node to invoke the second node to overwrite second data on the second storage unit with the first data.

* * * * *